(12) United States Patent
Ma et al.

(10) Patent No.: US 10,902,077 B2
(45) Date of Patent: Jan. 26, 2021

(54) SEARCH RESULT AGGREGATION METHOD AND APPARATUS BASED ON ARTIFICIAL INTELLIGENCE AND SEARCH ENGINE

(71) Applicant: BEIJING BAIDU NETCOM SCIENCE AND TECHNOLOGY CO., LTD., Beijing (CN)

(72) Inventors: Yanjun Ma, Beijing (CN); Jiachen Liu, Beijing (CN); Hua Wu, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 153 days.

(21) Appl. No.: 16/313,195

(22) PCT Filed: Sep. 5, 2016

(86) PCT No.: PCT/CN2016/098130
§ 371 (c)(1),
(2) Date: Dec. 26, 2018

(87) PCT Pub. No.: WO2018/000575
PCT Pub. Date: Jan. 4, 2018

(65) Prior Publication Data
US 2019/0163714 A1    May 30, 2019

(30) Foreign Application Priority Data
Jun. 27, 2016    (CN) .......................... 2016 1 0482110

(51) Int. Cl.
*G06F 16/30* (2019.01)
*G06F 16/9535* (2019.01)
(Continued)

(52) U.S. Cl.
CPC ...... *G06F 16/9535* (2019.01); *G06F 16/2465* (2019.01); *G06F 16/953* (2019.01);
(Continued)

(58) Field of Classification Search
CPC ............... G06F 16/9535; G06F 16/953; G06F 16/2465; G06F 16/9538; G06F 2216/03; G06N 20/00
See application file for complete search history.

(56) References Cited

U.S. PATENT DOCUMENTS 8,880,390 B2 * 11/2014 Ceylan .................. G06F 16/958
704/9
10,657,492 B1 * 5/2020 Wei ..................... G06Q 10/0875
(Continued)

FOREIGN PATENT DOCUMENTS

CN  103744866 A    4/2014
WO  WO-2015090123 A1 *  6/2015 ........... G06F 16/951

OTHER PUBLICATIONS

Chinese Patent Application No. 201610482110.5, English translation of Office Action dated Feb. 2, 2019, 10 pages.
(Continued)

*Primary Examiner* — Mahesh H Dwivedi
(74) *Attorney, Agent, or Firm* — Lathrop GPM LLP

(57) ABSTRACT

The present disclosure provides a search result aggregation method and apparatus based on artificial intelligence and a search engine. The method includes: obtaining a query; generating a plurality of search results according to the query; obtaining a plurality of corresponding demand dimensions according to the query; aggregating the plurality of demand dimensions according to the plurality of search results; obtaining an answer corresponding to each demand dimension, and aggregating the answers corresponding to the plurality of demand dimensions according to the aggregated demand dimensions to generate an aggregation result.

17 Claims, 5 Drawing Sheets

(51) Int. Cl.
*G06F 16/953* (2019.01)
*G06F 16/2458* (2019.01)
*G06N 20/00* (2019.01)
*G06F 16/9538* (2019.01)

(52) U.S. Cl.
CPC ......... *G06F 16/9538* (2019.01); *G06N 20/00* (2019.01); *G06F 2216/03* (2013.01)

(56) References Cited

U.S. PATENT DOCUMENTS

| | | | |
|---|---|---|---|
| 2005/0165777 A1* | 7/2005 | Hurst-Hiller | G06F 16/2471 |
| 2007/0239676 A1* | 10/2007 | Stonehocker | G06F 3/0482 |
| 2008/0010269 A1* | 1/2008 | Parikh | G06F 16/334 |
| 2013/0179427 A1* | 7/2013 | Archambault | G06F 16/9535 707/711 |
| 2015/0293927 A1* | 10/2015 | Wang | G06F 16/3322 707/706 |
| 2015/0294009 A1* | 10/2015 | Wang | G06F 16/248 707/706 |
| 2016/0055252 A1* | 2/2016 | Makeev | G06F 16/24578 707/733 |
| 2017/0039283 A1* | 2/2017 | Bennett | G06F 16/9535 |
| 2019/0355017 A1* | 11/2019 | Li | G06F 16/248 |

OTHER PUBLICATIONS

Chinese Patent Application No. 201610482110.5, Office Action dated Feb. 2, 2019, 9 pages.

\* cited by examiner

SEARCH RESULT AGGREGATION METHOD AND APPARATUS BASED ON ARTIFICIAL INTELLIGENCE AND SEARCH ENGINE

CROSS REFERENCE TO RELATED APPLICATION

This application is a U.S. national phase application of International Application No. PCT/CN2016/098130, filed on Sep. 5, 2016, which is based upon and claims priority to Chinese Patent Application Serial No. 201610482110.5, filed on Jun. 27, 2016, the entire contents of which are cooperated herein by reference.

FIELD

The present disclosure relates to a field of search engine technologies, and more particularly to a search result aggregation method and apparatus based on artificial intelligence and a search engine.

BACKGROUND

With the rapid development of the computer network technology, a search engine gradually becomes a most important, fast and convenient mode for people to obtain information. After a user inputs a query in the search engine, the search engine can return a search result of the query.

At present, a conventional search engine usually provides a plurality of search results and abstracts related to the query based on the query input by the user, that is, the user's demand is satisfied in a way similar to information retrieval. When clicking a link corresponding to the search result, the user may view page content of the search result, to find and summarize the answer.

However, there are following problems: (1) within the search results obtained in the above way, it is easy to occur homogenization phenomenon of several search results, increasing user's click cost; (2) since the search results obtained are mixed-up, the results are poorly readable, increasing user's lookup cost; (3) a search demand of the user is not analyzed, such that for a relatively complex problem, only one or two results may not meet the search demand of the user, resulting in poor search experience.

SUMMARY

The present disclosure aims to solve one of the technical problems in the related art to at least some extent.

A search result aggregation method based on artificial intelligence provided in a first aspect of embodiments of the present disclosure includes: obtaining a query; generating a plurality of search results according to the query; obtaining a plurality of corresponding demand dimensions according to the query; aggregating the plurality of demand dimensions according to the plurality of search results; obtaining an answer corresponding to each demand dimension, and aggregating the answers corresponding to the plurality of demand dimensions according to the aggregated demand dimensions to generate an aggregation result.

A search result aggregation apparatus based on artificial intelligence provided in a second aspect of embodiments of the present disclosure includes: a query obtaining module, configured to obtain a query; a search result obtaining module, configured to generate a plurality of search results according to the query; a demand dimension obtaining module, configured to obtain a plurality of correspondence demand dimensions according to the query; a first aggregation module, configured to aggregate the plurality of demand dimensions according to the plurality of search results; an answer obtaining module, configured to obtain an answer corresponding to each demand dimension; and a second aggregation module, configured to aggregate the answers corresponding to the plurality of demand dimensions according to the aggregated demand dimensions to generate an aggregation result.

A search engine provided in a third aspect of embodiments of the present disclosure includes a search result aggregation apparatus based on artificial intelligence provided in the second aspect of embodiments of the present disclosure.

A terminal provided in a fourth aspect of embodiments of the present disclosure includes: one or more processors, a memory, and one or more programs. The one or more programs are stored in the memory, and when being executed by the one or more processors, the one or more programs are configured to perform the following operations: obtaining a query; generating a plurality of search results according to the query; obtaining a plurality of corresponding demand dimensions according to the query; aggregating the plurality of demand dimensions according to the plurality of search results; obtaining an answer corresponding to each demand dimension, and aggregating the answers corresponding to the plurality of demand dimensions according to the aggregated demand dimensions to generate an aggregation result.

Additional aspects and advantages of embodiments of the present disclosure will be given in part in the following descriptions, and become apparent in part from the following descriptions, or be learned from the practice of the embodiments of the present disclosure.

BRIEF DESCRIPTION OF THE DRAWINGS

These and other additional aspects and advantages of embodiments of the present disclosure will become apparent and more readily appreciated from the following descriptions made with reference to the drawings, in which.

DETAILED DESCRIPTION

Description will be made in detail below to embodiments of the present disclosure. Examples of embodiments are illustrated in the accompanying drawings, in which, the same or similar numbers represent the same or similar elements or elements with the same or similar functions. Embodiments described below with reference to the accompanying drawings are exemplary, which are intended to explain the present disclosure and do not be understood a limitation of the present disclosure.

At present, a conventional search engine usually gives N pieces of search results (for example URL (Uniform Resource Locator) addresses) and abstracts based on the query input by the user, that is, the user's demand is satisfied in a way similar to information retrieval. However, this "find-it and fix-it mentality" method in nowadays is obviously unable to keep up with the user demand. Especially, the problems faced today are more and more complicated, and any knowledge has a plurality of extension meanings besides its own connotation. The same is true for demand, for example, the user inputs a query "Andy Lau", and then in addition to the demand of the knowledge encyclopedia type, there are a plurality of potential demands such as pictures, videos, audio, news, and the priorities of the demands will vary from person to person. Since the screen is large on the PC side, the amount of information that can be carried is large, and by showing a diversity of results, this problem may be solved to some extent. However, for a mobile terminal, hardware such as a screen size and an input mode of the mobile terminal is limited, such that click and input costs of the user are increased. Therefore, the present disclosure provides a search result aggregation method and apparatus based on artificial intelligence and a search engine. In detail, the search result aggregation method and apparatus based on artificial intelligence and the search engine provided in embodiments of the present disclosure will be described with reference to the accompanying drawings.

Figure 1:
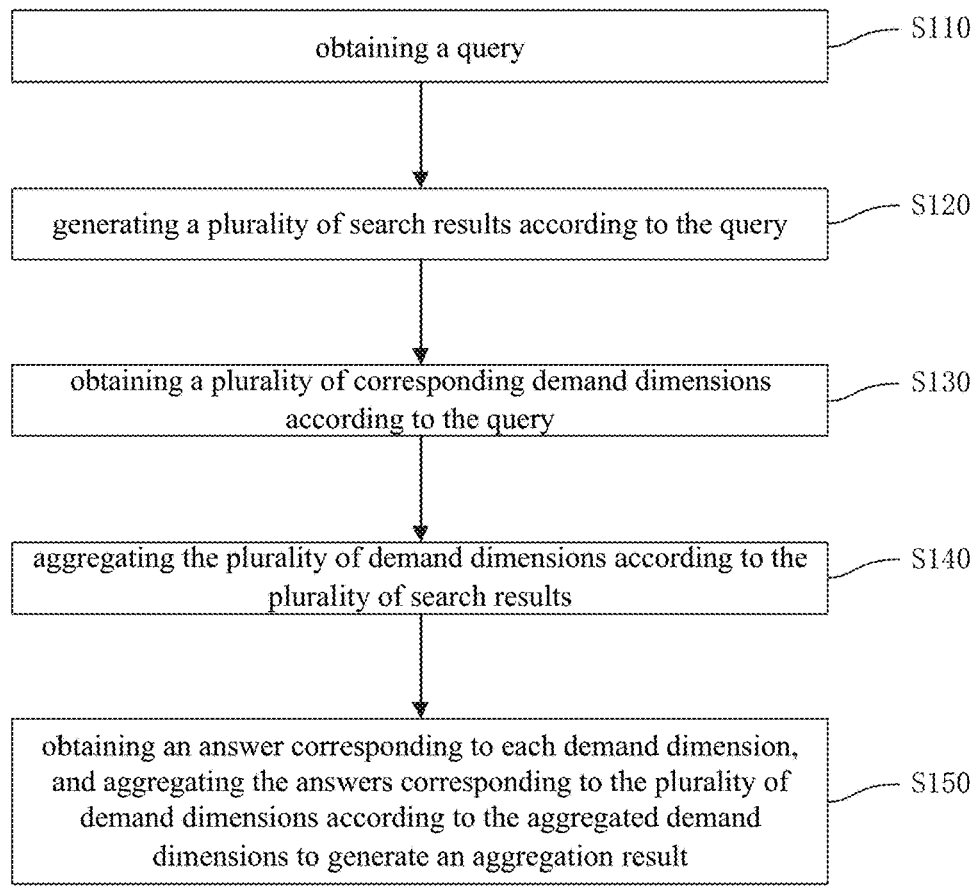
FIG. 1 is a flow chart illustrating a search result aggregation method based on artificial intelligence according to an embodiment of the present disclosure.

FIG. 1 is a flow chart illustrating a search result aggregation method based on artificial intelligence according to an embodiment of the present disclosure. As illustrated in FIG. 1, the search result aggregation method based on artificial intelligence may include the following blocks.

In block S110, a query is obtained.

For example, it is assumed that the search result aggregation method based on artificial intelligence provided in embodiments of the present disclosure is applicable to a search engine. The search engine may provide an input interface for the user, such that the user may input the query via the input interface. When it is detected that the user inputs the query via the input interface, the query may be obtained. The query may include but not limited to Chinese, letters, Japanese, Korean, numbers, special characters (such as @, ^, etc.). In addition, the query may be a Chinese character text input by the user, and further may be a speech input by the user.

In block S120, a plurality of search results is generated according to the query.

In detail, after obtaining the query, searching may be performed according to the query, to find a plurality of search results corresponding to the query.

In block S130, a plurality of corresponding demand dimensions are obtained according to the query.

It should be understood that, there are a plurality of ways to obtain the plurality of corresponding demand dimensions according to the query. For example, online analysis may be performed on the query, that is, demand analysis is performed on the query online, to obtain the plurality of demand dimensions corresponding to the query. As another example, a large amount of queries and the corresponding plurality of demand dimensions may be first collected by offline analysis, that is, a comparison table of queries and demand dimensions is generated, such that when a query of a target user is obtained, the plurality of demand dimensions corresponding to the query are searched for in the pre-generated comparison table of queries and demand dimensions.

As an example, the comparison table of queries and demand dimensions may be obtained firstly, and then the searching is performed in the comparison table of queries and demand dimensions according to the query to obtain the plurality of demand dimensions corresponding to the query.

It should be understood that, there are a plurality of ways to generate the comparison table of queries and demand dimensions. For example, the demand dimensions may be mined according to user's active behavior change information in user session information; as another example, the demand dimensions may be mined based on Title and URL information.

Figure 2:
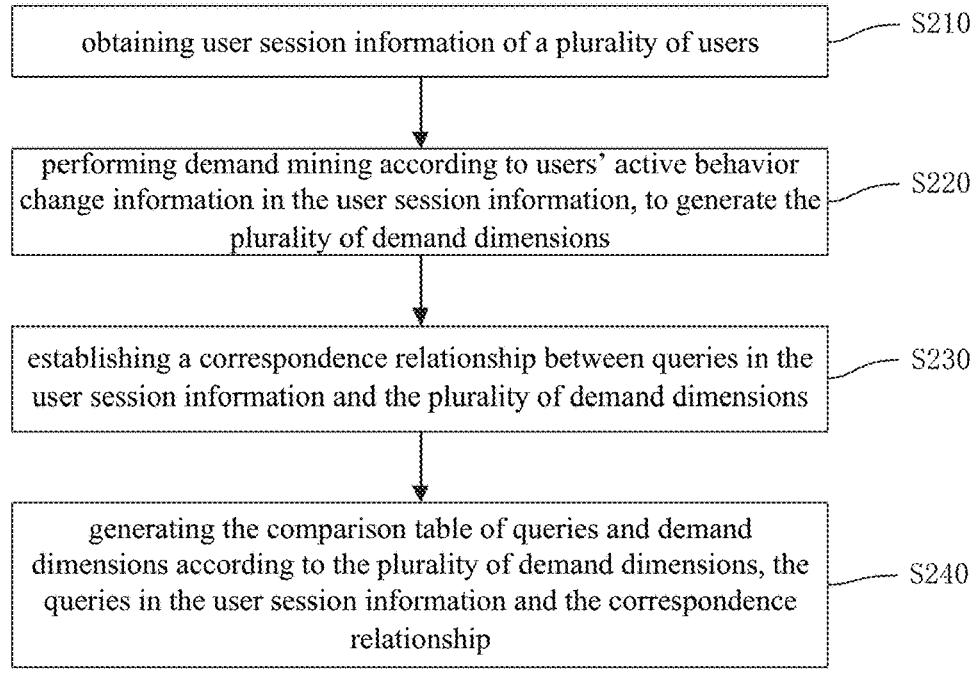
FIG. 2 is a flow chart illustrating generating a comparison table of queries and demand dimensions according to an embodiment of the present disclosure.

As an example, as illustrated in FIG. 2, the comparison table of queries and demand dimensions may be pre-generated by the following blocks.

In block S210, the user session information of a plurality of users is obtained.

Since there are massive data existing on the Internet, this characteristic of the Internet may be used to obtain the user session information generated by a large number of sample users using the search engine. It should be understood that, the user session information may include but not limited to queries input by the sample users.

In block S220, demand mining is performed according to the users' active behavior change information in the user session information, to generate the plurality of demand dimensions.

It should be understood that, the user session information may include the plurality of queries input by the user, and there is a correlation among the plurality of queries. Therefore, summarizing is performed on the queries input by the plurality of users according to the correlation among the plurality of the queries, and then the demand mining may be performed for the active behavior change of those queries with the correlation to obtain the plurality of demand dimensions. For example, taking user session information={Andy Lau, Andy Lau movie, Andy Lau movie download} as an example, it may be seen that, the user session information may include queries "Andy Lau", "Andy Lau movie" and "Andy Lau movie download", and there is a correlation among the three queries, in which, "movie" is a demand dimension of "Andy Lau", and "download" is a demand dimension of "Andy Lau movie". Therefore, the demand dimension mining may be realized according to the user's active behavior change in the user session information.

In block S230, a correspondence relationship between queries in the user session information and the plurality of demand dimensions is established.

In block S240, the comparison table of queries and demand dimensions is generated according to the plurality of demand dimensions, the queries in the user session information and the correspondence relationship.

In other words, summarizing may be performed on the plurality of demand dimensions and the queries in the user session information according to the foregoing correspondence relationship, to obtain the comparison table of queries and demand dimensions.

Figure 3:
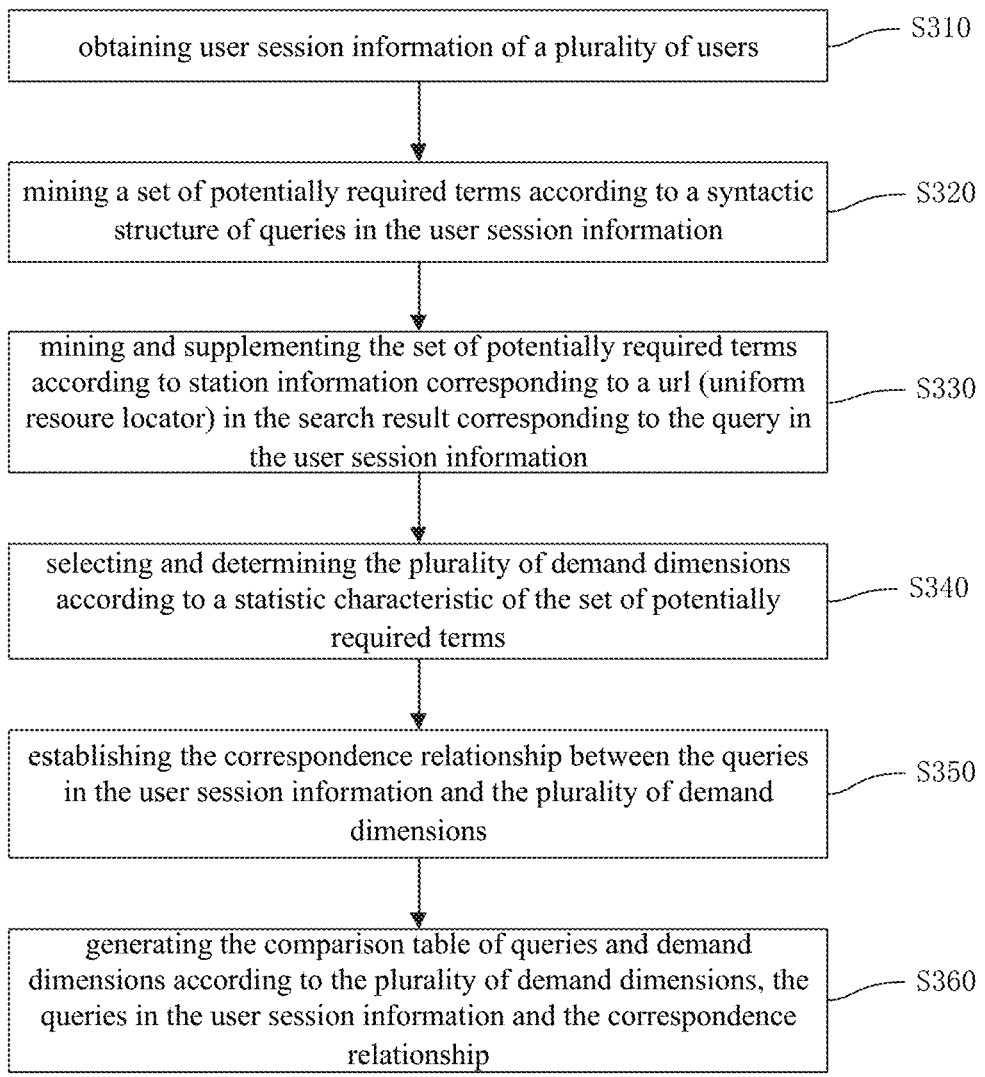
FIG. 3 is a flow chart illustrating generating a comparison table of queries and demand dimensions according to another embodiment of the present disclosure.

As another example, as illustrated in FIG. 3, the comparison table of queries and demand dimensions may be pre-generated by the following blocks.

In block S310, user session information of a plurality of users is obtained.

In block S320, a set of potential demand-related terms is mined according to a syntactic structure of queries in the user session information.

In block S330, the set of potential demand-related terms is mined and supplemented according to station information corresponding to urls (uniform resource locator) in the search results corresponding to the queries in the user session information.

In block S340, the plurality of demand dimensions is selected and determined according to a statistic characteristic of the set of potential demand-related terms.

In block S350, the correspondence relationship between the queries in the user session information and the plurality of demand dimensions is established.

In block S360, the comparison table of queries and demand dimensions is generated according to the plurality of demand dimensions, the queries in the user session information and the correspondence relationship.

In block S140, aggregation is performed on the plurality of demand dimensions according to the plurality of search results.

In detail, in embodiments of the present disclosure, the aggregation may be performed on the plurality of demand dimensions according to the plurality of search results as follows. Firstly, syntactic structures of titles and abstracts in the plurality of search results are analyzed, and station information and webpage types corresponding to urls in the plurality of search results are analyzed. Finally, the plurality of demand dimensions are aggregated according to the syntactic structures of the titles, the syntactic structures of the abstracts, the station information and the webpage types.

In detail, in the plurality of search results, each search result includes a title, an abstract and url information. Afterwards, the syntactic structures of the titles, the syntactic structures of the abstracts, the station information of the urls and the webpage types corresponding to the urls are respectively extracted according to those information. Then, the aggregation is performed on the plurality of demand dimensions corresponding to the query according to these analysis results, to aggregate the same or similar demands. For example, "why" and "the cause" have demands of the same meaning, "how to do" and "how to solve" have demands of the same meaning, and "where to repair" and "breakdown maintenance" have demands of the same meaning, and the like.

In block S150, the answer corresponding to each demand dimension is obtained, and the answers corresponding to the plurality of demand dimensions is aggregated according to the aggregated demand dimensions to generate an aggregation result.

In detail, answer content corresponding to each demand dimension is obtained from the plurality of search results, and then the answer corresponding to each demand dimension is mapped to the aggregated demand dimensions, and the answers mapped to the same demand dimension are aggregated together to generate the aggregation result. For example, taking a query "Xiaomi 4 restarts automatically" as an example, then under the "breakdown cause" demand dimension, search result content may mention a plurality of similar opinions, for example "software is not compatible", and "mobile phone hardware has a problem". Aggregation is performed on the answer contents under the "breakdown cause" demand dimension by the content aggregation, to obtain result aggregation content under the demand dimension. It should be understood that, in order to avoid redundancy of the result content, after aggregating the answers corresponding to the plurality of demand dimensions according to the aggregated demand dimensions, normalization is performed on the aggregated results, to avoid that the same contents appear repeatedly.

In more detail, in the plurality of search results, each search result includes a title, an abstract and url information, and the syntactic structures of the titles, the syntactic structures of the abstracts, the station information of the urls and the webpage types corresponding to the urls are respectively extracted according to those information. Then, a machine learning model is established based on a great amount of user session information according to those analysis results, to map each search result to a certain demand dimension (such as the foregoing aggregated demand dimension). Finally, the results mapped to the same demand dimension are aggregated together, to obtain the aggregation result.

In detail, aggregating the answers corresponding to the plurality of demand dimensions according to the aggregated demand dimension is the typical machine learning process in artificial intelligence. Firstly, a characteristic set is extracted according to the titles, the abstracts and the url information of the search results, in which the characteristic set includes but not limited to semantic characteristic, synaptic structure characteristic, demand-related term characteristic, and url station type characteristic. The ordinary skilled in the art may adjust the characteristic set according to the completeness of existing user session data, semantics, and page classification tools. Afterwards, the characteristic set is extracted with respect to the great amount of user session information with demand dimension marking, and multiple classifiers are trained to learn a mapping relationship between the characteristic set and a set of demand dimensions. The multiple classifiers used in this block may be a traditional learning model taking a support vector machine as an example, an integrated machine learning model taking random forest as an example, or a complex machine learning model taking deep neural networks as an example. The ordinary skilled in the art may select a suitable model by trying and comparing according to data quantity, characteristic quantity and computer device performance. Finally, after the plurality of search results are obtained according to the query, the characteristics are extracted with respect to the plurality of search results and are mapped by the multiple classifiers, such that the demand dimension corresponding to each search result may be known, and the aggregation is finished according to whether the demand dimensions are same.

For example, taking the query "Andy Lau" as an example, there are two results titled "Andy Lau's latest movie watch online" and "Andy Lau's classic movie watch" in the plurality of search results. By analyzing syntax of the title, it may be known that a demand-related term of both results is "watch", and the station of urls is online video site. The trained machine learning model may simultaneously map the two results to a "video" demand dimension according to those characteristics. Finally, the two results are aggregated together due to being mapped to the same demand dimension. It should be understood that, in a way as illustrated in this example, the aggregation may be performed on the plurality of search results, such that one or more search results may be associated with each demand dimension associated with the query.

Therefore, by multi-level analysis on search demands and results, the search results are re-aggregated and displayed, which may link to a server accurately while satisfying the user's information demand. For example, under a "maintenance merchant" dimension, the search results may directly give an address of an official maintenance shop, or even a customer service platform. It should be understood that, different service contents may be provided for the user according to different demand dimensions, for example question answer content, purchase information content, and maintenance service content.

In order to enable the skilled in the art to know about the present disclosure more clearly, examples will be made below.

Figures 4A, 4B, 4C:
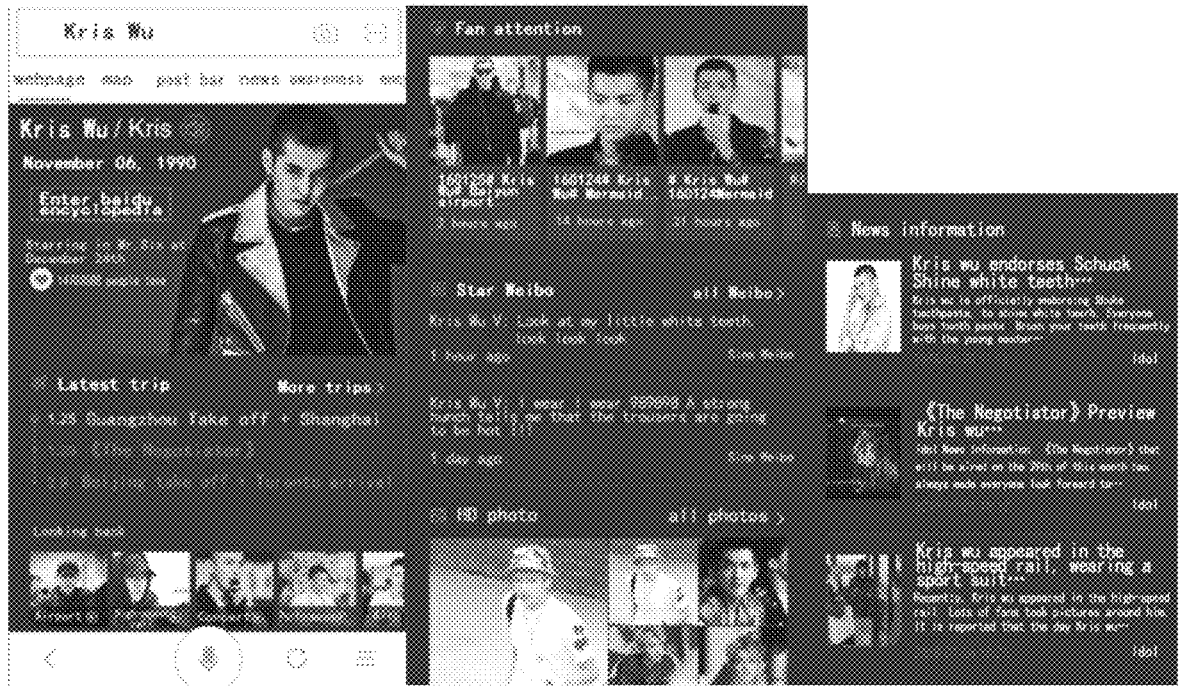
FIGS. 4(a), 4(b), and 4(c) are schematic diagrams illustrating displaying an aggregation result obtained by taking a query "Kris Wu" as an example in a mobile terminal according to an embodiment of the present disclosure.

For example, taking a query "Kris Wu" as an example, after obtaining the query "Kris Wu", a plurality of corresponding search results may be generated according to the query, and a plurality of corresponding demand dimensions are queried from the comparison table of queries and demand dimensions according to the query, for example, "knowledge encyclopedia" demand dimension, "star trip" demand dimension, "fan focus" dimension, "star Weibo" dimension, "image" dimension, "news" dimension, etc. Then, the plurality of demand dimensions are aggregated according to the plurality of search results obtained above, that is, classification is performed on the plurality of demand dimensions according to the search results, and that is, the demand dimensions with the same meaning are classified into one category, to finish the aggregation of the plurality of demand dimensions. Then, answer content corresponding to each demand dimension (that is, a demand dimension obtained first) may be obtained from the plurality of search results. Finally, the aggregation is performed on answers corresponding to respective demand dimensions according to aggregated demand dimensions, to obtain the aggregation result. For example, as illustrated in FIG. 4(a), FIG. 4(b) and FIG. 4(c), which are the aggregation result corresponding to the query "Kris Wu" displayed in a browser application of a mobile phone, the aggregation result includes the foregoing demand dimensions and result contents corresponding to each demand dimension.

Figures 5A, 5B, 5C:
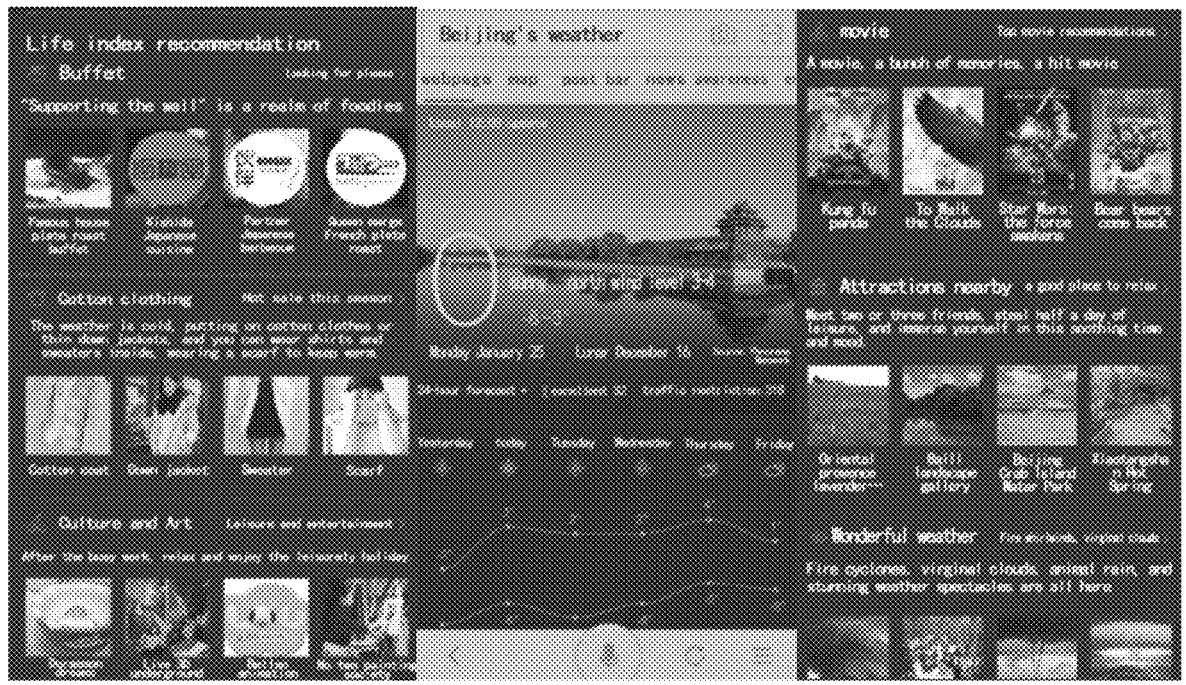
FIGS. 5(a), 5(b), and 5(c) are schematic diagrams illustrating displaying an aggregation result obtained by taking a query "Beijing's weather" as an example in a mobile terminal according to an embodiment of the present disclosure.

As another example, taking a query "Beijing's weather", after obtaining the query "Beijing's weather", a plurality of corresponding search results may be generated according to the query, and a plurality of corresponding demand dimensions are queried from the comparison table of queries and demand dimensions according to the query, for example, "Real-time weather" demand dimension, "life index" demand dimension, in which the "life index" demand dimension may further include "food" demand dimension, "dressing" demand dimension, "cultural leisure" demand dimension, "attraction" demand dimension, etc. Then, the plurality of demand dimensions are aggregated according to the plurality of search results obtained above, that is, classification is performed on the plurality of demand dimensions according to the search results, and that is, the demand dimensions with the same meaning are classified into one category, to finish the aggregation of the plurality of demand dimensions. Then, answer content corresponding to each demand dimension (that is, a demand dimension obtained first) may be obtained from the plurality of search results. Finally, the aggregation is performed on answers corresponding to respective demand dimensions according to aggregated demand dimensions, to obtain an aggregation result. For example, as illustrated in FIG. 5(a), FIG. 5(b) and FIG. 5(c), which are the aggregation result corresponding to the query "Beijing's weather" in a browser application of a mobile phone, the aggregation result includes the foregoing demand dimensions and result contents corresponding to each demand dimension.

In conclusion, with the search result aggregation method based on artificial intelligence provided in embodiments of the present disclosure, the search demands of the user are aggregated on the demand dimension firstly. For a single-demand problem, by multiple-dimension analysis of the results, the search results are classified and arranged, and dimension characteristics are extracted, to achieve accurate satisfaction of information and accurate offer of services. For a multiple-demand problem, the demands are classified and aggregated firstly, and then displayed in levels, such that the user may find what he wants without having to re-launch a new search. Thus, when the single-demand problem is satisfied, related questions and related results are recommended intelligently, to give the user an immersive experience. For example, the user inputs "Xiaomi restarts automatically", and a plurality of demands such as "malfunction cause", "solutions", "maintenance merchants" are obtained by demand analysis and aggregation; for "solutions", a plurality of demand dimensions such as "Xiaomi 3" and "Xiaomi4" may be obtained; for a specified dimension, for example "solutions of Xiaomi4", a plurality of practical solutions such as "underlay the battery end with paper", "press the battery holder gold finger", "plug in the charger" may be summarized by aggregating and concluding the results, such that the practical problem of the user may be solved in multiple levels and multiple dimensions.

With the search result aggregation method based on artificial intelligence provided in embodiments of the present disclosure, the query may be obtained first, and then, the plurality of search results may be generated according to the query, and the plurality of corresponding demand dimensions may be obtained according to the query, and then, the plurality of demand dimensions may be aggregated according to the plurality of search results, and finally, the answer corresponding to each demand dimension may be obtained, and the answers corresponding to the plurality of demand dimensions may be aggregated according to the aggregated demand dimensions to generate the aggregation result. The method has at least following advantages: (1) the results are de-duplicated, cross-validated, reordered and the like by means of aggregation, which reduces repeated click behaviors of the user, and also provides the aggregation result as a reference to assist the user in making decisions; (2) by aggregating the demand dimensions corresponding to the query and aggregating result contents of each demand dimension, i.e., re-aggregating mixed-up results, the search results have a clear logic, clear levels, and are easy to be browsed, which helps users find what they want faster.

Figure 6:
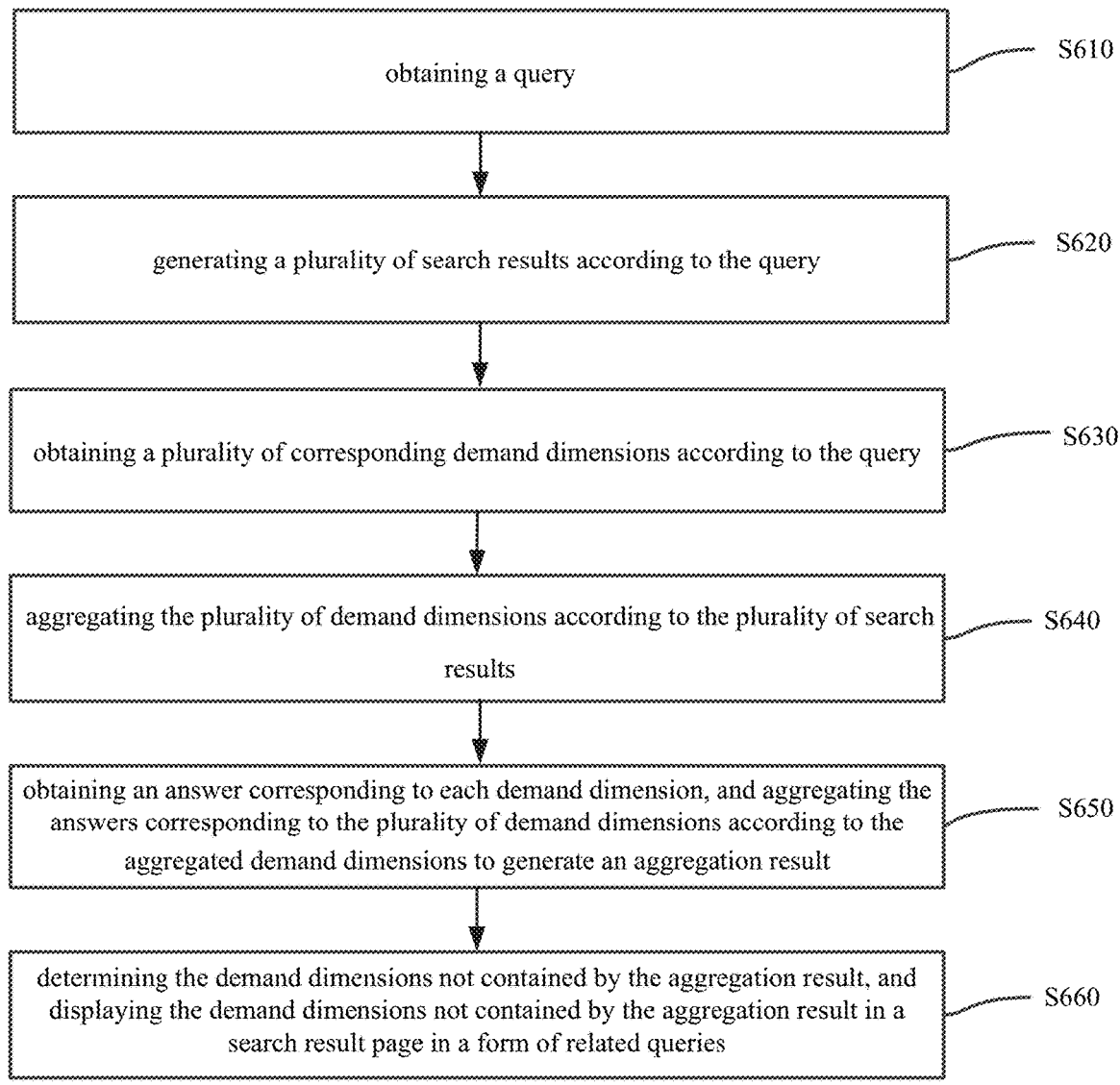
FIG. 6 is a flow chart illustrating a search result aggregation method based on artificial intelligence according to a detailed embodiment of the present disclosure.

FIG. 6 is a flow chart illustrating a search result aggregation method based on artificial intelligence according to a detailed embodiment of the present disclosure.

In embodiments of the present disclosure, in order to improve the search experience of the user, and enable the user to find what he wants in an immersive browsing experience, related results of other dimensions may be given by means such as guidance and excitation. In detail, as illustrated in FIG. 6, the search result aggregation method based on artificial intelligence may include the following blocks.

In block S610, a query is obtained.

In block S620, a plurality of search results are generated according to the query.

In block S630, a plurality of corresponding demand dimensions are obtained according to the query.

As an example, a comparison table of queries and demand dimensions may be obtained firstly, and then searching is performed in the comparison table of queries and demand dimensions according to the query to obtain the plurality of demand dimensions corresponding to the query.

It should be understood that, there may be a plurality of ways to generate the comparison table of queries and demand dimensions. For example, the demand dimensions may be mined according to the user's active behavior change in user session information. As another example, the demand dimensions may be mined based on Title and URL information.

As an example, as illustrated in FIG. 2, the comparison table of queries and demand dimensions may be pre-generated by the following blocks.

In block S210, user session information of a plurality of users is obtained.

In block S220, demand mining is performed according to the users' active behavior change information in the user session information, to generate the plurality of demand dimensions.

In block S230, a correspondence relationship between queries in the user session information and the plurality of demand dimensions is established.

In block S240, the comparison table of queries and demand dimensions is generated according to the plurality of demand dimensions, the queries in the user session information and the correspondence relationship.

As another example, as illustrated in FIG. 3, the comparison table of queries and demand dimensions may be pre-generated by the following blocks.

In block S310, user session information of a plurality of users is obtained.

In block S320, a set of potential demand-related terms is mined according to a syntactic structure of queries in the user session information.

In block S330, the set of potential demand-related terms is mined and supplemented according to station information corresponding to urls (uniform resource locator) in the search results corresponding to the queries in the user session information;

In block S340, the plurality of demand dimensions are selected and determined according to a statistic characteristic of the set of potential demand-related terms.

In block S350, the correspondence relationship between the queries in the user session information and the plurality of demand dimensions is established.

In block S360, the comparison table of queries and demand dimensions is generated according to the plurality of demand dimensions, the queries in the user session information and the correspondence relationship.

In block S640, the plurality of demand dimensions are aggregated according to the plurality of queries.

In detail, in embodiments of the present disclosure, the plurality of demand dimensions are aggregated according to the plurality of search results as follows. Firstly, syntactic structures of titles and abstracts in the plurality of search results are analyzed, and station information and webpage types corresponding to urls in the plurality of search results are analyzed. Finally, the plurality of demand dimensions are aggregated according to the syntactic structures of the titles, the syntactic structures of the abstracts, the station information and the webpage types.

In block S650, the answer corresponding to each demand dimension is obtained, and the answers corresponding to the plurality of demand dimensions are aggregated according to the aggregated demand dimensions to generate the aggregation result.

In detail, in an embodiment of the present disclosure, the answer content corresponding to each demand dimension may be obtained from the plurality of search results, and then the answers corresponding to respective demand dimensions are mapped to the aggregated demand dimensions, and the answers mapped to the same demand dimension are aggregated together to generate the aggregation result.

In block S660, demand dimensions not contained by the aggregation result are determined, and the demand dimensions not contained by the aggregation result are displayed in a search result page in a form of related queries.

For example, after obtaining the aggregation result, based on the foregoing comparison table of queries and demand dimensions, the demand dimensions not contained by the aggregation result may be displayed in the search result page in the form of related queries, to be provided for the user and give the user a heuristic guide, such that when the user clicks the related query, a new search demand may be triggered and block S610 may be returned to, achieving an objective of comprehensively satisfying users' needs.

With the search result aggregation method based on artificial intelligence provided in embodiments of the present disclosure, after obtaining the aggregation result, the demand dimensions not contained by the aggregation result may be determined, and may be displayed in the search result page in the form of related queries. That is, the demand dimensions not contained by the aggregation result are displayed in the search result page in the form of related queries, to be provided for the user and give the user a heuristic guide, such that related results of other dimensions may be given by means such as guidance and stimulation, and the user may find what he wants in an immersive browsing experience.

Figure 7:
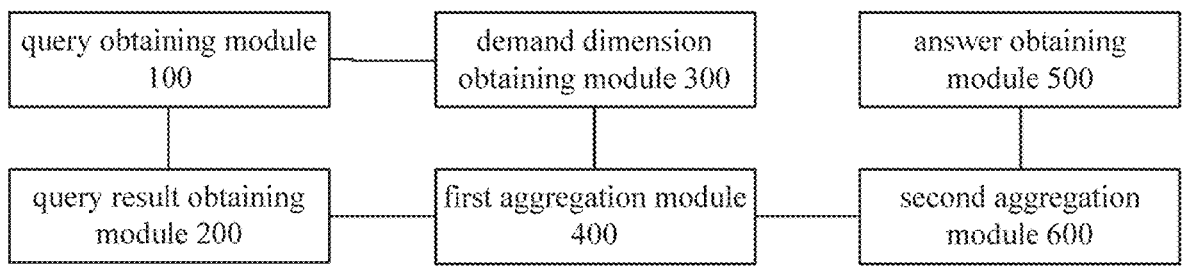
FIG. 7 is a block diagram illustrating a search result aggregation apparatus based on artificial intelligence according to an embodiment of the present disclosure.

Corresponding to the search result aggregation method based on artificial intelligence provided in the foregoing embodiments of the present disclosure, embodiments of the present disclosure further provide a search result aggregation apparatus based on artificial intelligence. Since the search result aggregation apparatus based on artificial intelligence provided in embodiments of the present disclosure corresponds to the search result aggregation method based on artificial intelligence provided in the foregoing embodiments of the present disclosure, the foregoing implementations of the search result aggregation method based on artificial intelligence are applicable to the search result aggregation apparatus based on artificial intelligence provided in embodiments of the present disclosure, which will not be described in detail in embodiments. FIG. 7 is a block diagram illustrating a search result aggregation apparatus based on artificial intelligence according to an embodiment of the present disclosure. As illustrated in FIG. 7, the search result aggregation apparatus based on artificial intelligence may include: a query obtaining module 100, a search result obtaining module 200, a demand dimension obtaining module 300, a first aggregation module 400, an answer obtaining module 500 and a second aggregation module 600.

In detail, the query obtaining module 100 may be configured to obtain a query.

The search result obtaining module 200 may be configured to generate a plurality of search results according to the query.

The demand dimension obtaining module 300 may be configured to obtain a plurality of corresponding demand dimensions according to the query. In detail, in an embodiment of the present disclosure, the demand dimension obtaining module 300 may obtain a pre-generated comparison table of queries and demand dimensions firstly, and then perform searching in the comparison table of queries and demand dimensions according to the query to obtain the plurality of demand dimensions corresponding to the query.

Figure 8:
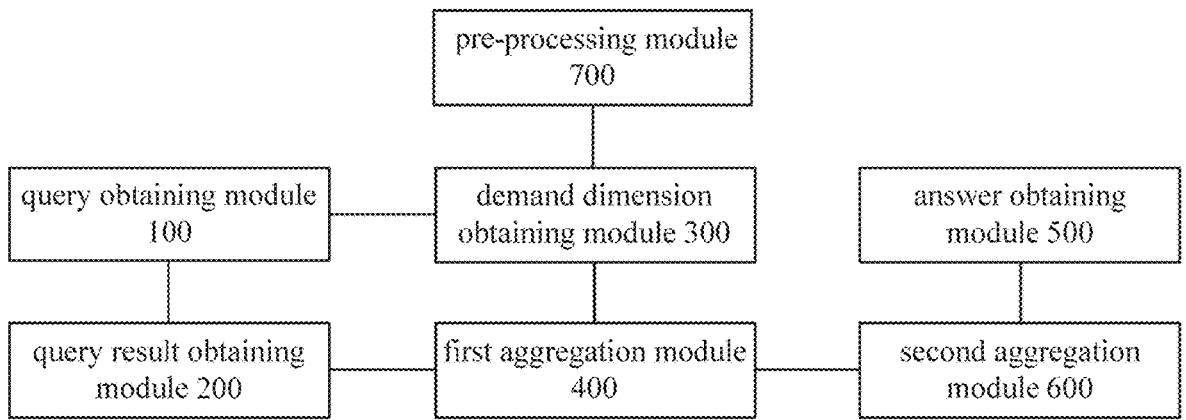
FIG. 8 is a block diagram illustrating a search result aggregation apparatus based on artificial intelligence according to a detailed embodiment of the present disclosure.

Further, in an embodiment of the present disclosure, as illustrated in FIG. 8, the search result aggregation apparatus based on artificial intelligence may further include a pre-processing module 700. The pre-processing module 700 may be configured to obtain user session information of a plurality of users, and perform demand mining according to user's active behavior change information in the user session information to generate the plurality of demand dimensions, and establish a correspondence relationship between queries in the user session information and the plurality of demand dimensions, and generate the comparison table of queries and demand dimensions according to the plurality of demand dimensions, the queries in the user session information and the correspondence relationship.

In another embodiment of the present disclosure, the pre-processing module 700 may be further configured to: obtain user session information of a plurality of users, mine a set of potential demand-related terms according to a syntactic structure of the queries in the user session information, mine and supplement the set of potential demand-related terms according to station information corresponding to urls in the search results corresponding to the queries in the user session information, select and determine the plurality of demand dimensions according to a statistic characteristic of the set of potential demand-related terms, establish the correspondence relationship between the queries in the user session information and the plurality of demand dimensions, and generate the comparison table of queries and demand dimensions according to the plurality of demand dimensions, the queries in the user session information and the correspondence relationship.

Figure 9:
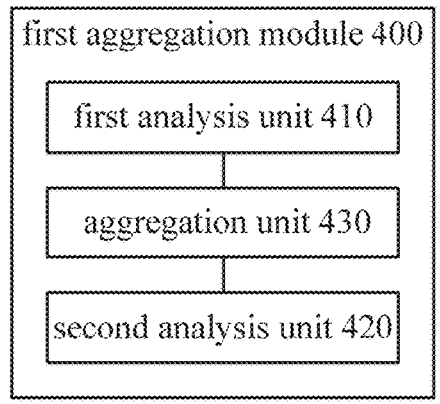
FIG. 9 is a block diagram illustrating a first aggregation module according to an embodiment of the present disclosure.

The first aggregation module 400 may be configured to aggregate the plurality of demand dimensions according to the plurality of search results. In detail, in an embodiment of the present disclosure, as illustrated in FIG. 9, the first aggregation module 400 may include: a first analysis unit 410, a second analysis unit 420 and an aggregation unit 430. The first analysis unit 410 may be configured to analyze syntactic structures of titles and abstracts in the plurality of search results. The second analysis unit 420 may be configured to analyze situation information and webpage types corresponding to urls in the plurality of search results. The aggregation unit 430 may be configured to aggregate the plurality of demand dimensions according to the syntactic structures of the titles, the syntactic structures of the abstracts, the situation information and the webpage types.

The answer obtaining module 500 may be configured to obtain the answer corresponding to each demand dimension. In detail, in embodiments of the present disclosure, the answer obtaining module 500 may obtain the answer corresponding to each demand dimension from the plurality of search results.

The second aggregation module 600 may be configured to aggregate the answers corresponding to the plurality of demand dimensions according to the aggregated demand dimensions, to generate the aggregation result. In detail, in embodiments of the present disclosure, the second aggregation module 600 may map the answers corresponding to respective demand dimensions to the aggregated demand dimensions, and aggregate the answers mapped to the same demand dimension together to generate the aggregation result.

Figure 10:
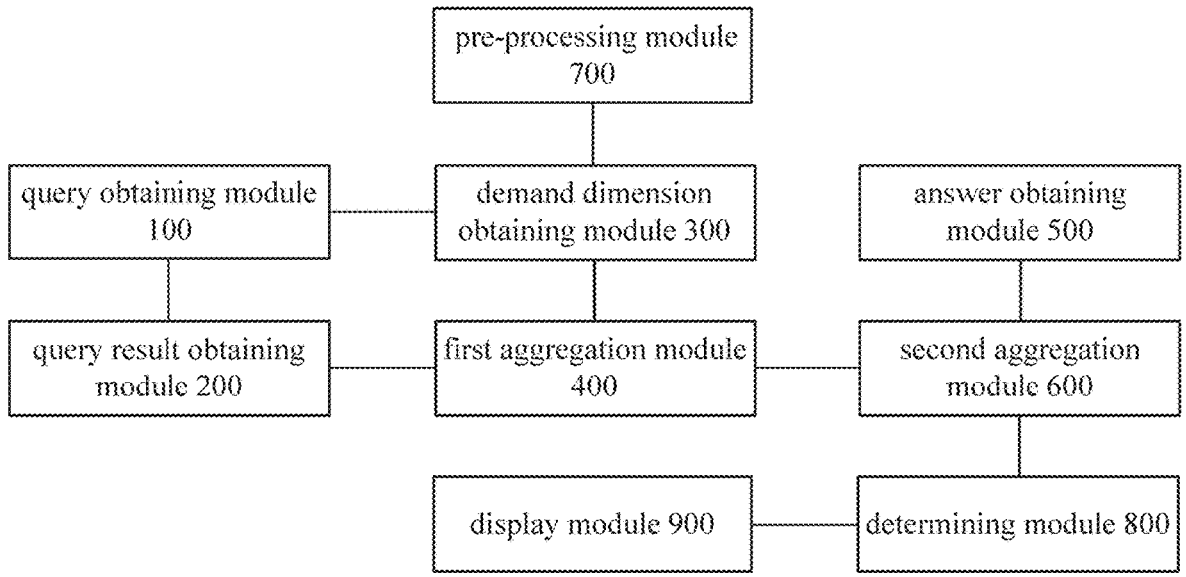
FIG. 10 is a block diagram illustrating a search result aggregation apparatus based on artificial intelligence according to another detailed embodiment of the present disclosure.

Further, in an embodiment of the present disclosure, as illustrated in FIG. 10, the search result aggregation apparatus based on artificial intelligence may further include a determining module 800 and a display module 900. The determining module 800 may be configured to determine demand dimensions not contained by the aggregation result. The display module 900 may be configured to display the demand dimensions not contained by the aggregation result in a search result page in a form of related queries.

With the search result aggregation apparatus based on artificial intelligence provided in embodiments of the present disclosure, the query obtaining module may obtain the query, the search result obtaining module may generate the plurality of search results according to the query, the demand dimension obtaining module may obtain the plurality of corresponding demand dimensions according to the query, the first aggregation module may aggregate the plurality of demand dimensions according to the plurality of search results, the answer obtaining module may obtain an answer corresponding to each demand dimension, and the second aggregation module may aggregate the answers corresponding to the plurality of demand dimensions according to the aggregated demand dimensions to generate the aggregation result. The apparatus has at least following advantages: (1) the results are de-duplicated, cross-validated, reordered and the like by means of aggregation, which reduces repeated click behaviors of the user, and also provides the aggregation result as a reference to assist the user in making decisions; (2) by aggregating the demand dimensions corresponding to the query and aggregating result contents of each demand dimension, i.e., re-aggregating mixed-up results, the search results have a clear logic, clear levels, and are easy to be browsed, which helps users find what they want faster.

To achieve the above embodiments, the present disclosure further provides a search engine, and the search engine may include the search result aggregation apparatus based on artificial intelligence described in any one of foregoing embodiments of the present disclosure.

With the search engine provided in embodiments of the present disclosure, the query may be obtained by the query obtaining module in the search result aggregation apparatus, the plurality of search results may be generated by the search result obtaining module according to the query, the plurality of corresponding demand dimensions may be obtained by the demand dimension obtaining module according to the query, the plurality of demand dimensions may be aggregated by the first aggregation module according to the plurality of search results, the answer corresponding to each demand dimension may be obtained by the answer obtaining module, and the answers corresponding to the plurality of demand dimensions may be aggregated by the second aggregation module according to the aggregated demand dimensions to generate the aggregation result. The search engine has at least following advantages: (1) the results are de-duplicated, cross-validated, reordered and the like by means of aggregation, which reduces repeated click behaviors of the user, and also provides the aggregation result as a reference to assist the user in making decisions; (2) by aggregating the demand dimensions corresponding to the query and aggregating result contents of each demand dimension, i.e., re-aggregating mixed-up results, the search results have a clear logic, clear levels, and are easy to be browsed, which helps users find what they want faster.

To achieve the above embodiments, the present disclosure further provides a terminal, including: one or more processors; a memory and one or more programs. The one or more programs are stored in the memory, and when being executed by the one or more processors, perform following operations:

S110', obtaining a query;

S120', generating a plurality of search results according to the query;

S130', obtaining a plurality of corresponding demand dimensions according to the query;

S140', aggregating the plurality of demand dimensions according to the plurality of search results;

S150', obtaining an answer corresponding to each demand dimension, and aggregating the answers corresponding to the plurality of demand dimensions according to the aggregated demand dimensions to generate an aggregation result.

In description of the present disclosure, it should be understood that, the terms "first", "second" are only for description purpose, and it cannot be understood as indicating or implying its relative importance or implying the number of indicated technology features. Thus, features defined as "first", "second" may explicitly or implicitly include at least one of the features. In the description of the present disclosure, "a plurality of" means at least two, such as two, three, unless specified otherwise.

In the description of the present disclosure, reference throughout this specification to "an embodiment," "some embodiments," "an example," "a specific example," or "some examples," means that a particular feature, or characteristic described in connection with the embodiment or example is included in at least one embodiment or example of the present disclosure. The appearances of the phrases in various places throughout this specification are not necessarily referring to the same embodiment or example of the present disclosure. Furthermore, the particular features, or characteristics may be combined in any suitable manner in one or more embodiments or examples. In addition, without a contradiction, the different embodiments or examples and the features of the different embodiments or examples can be combined by those skilled in the art.

Any procedure or method described in the flow charts or described in any other way herein may be understood include one or more modules, portions or parts for executing instruction codes that implement steps of a custom logic function or procedure. And preferable embodiments of the present disclosure includes other implementation, in which the order of execution is different from that which is depicted or discussed, including executing functions in a substantially simultaneous manner or in an opposite order according to the related functions, which may be understood by the skilled in the art of embodiments of the present disclosure.

The logic and/or step described in other manners herein or shown in the flow chart, for example, a particular sequence table of executable instructions for realizing the logical function, may be specifically achieved in any computer readable medium to be used by the instruction execution system, device or equipment (such as a system based on computers, a system including processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium include but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that, respective parts of the present disclosure may be implemented with hardware, software, firmware or a combination thereof. In the above implementations, a plurality of steps or methods may be implemented by software or firmware that is stored in the memory and executed by an appropriate instruction executing system. For example, if it is implemented by hardware, it may be implemented by any one of the following technologies known in the art or a combination thereof as in another embodiment: a discrete logic circuit(s) having logic gates for implementing logic functions upon data signals, an Application Specific Integrated Circuit having appropriate combinational logic gates, a Programmable Gate Array(s) (PGA), a Field Programmable Gate Array (FPGA), etc.

The common technical personnel in the field may understand that all or some steps in the above embodiments may be completed by the means that relevant hardware is instructed by a program. The programs may be stored in a computer readable storage medium, and the programs include any one or combination of the steps in embodiments when being executed.

In addition, respective function units in respective embodiments of the present disclosure may be integrated in a processing unit, and respective unit may further exist physically alone, and two or more units may further be integrated in a unit. The foregoing integrated unit may be implemented either in the forms of hardware or software. If the integrated module is implemented as a software functional module and is sold or used as a stand-alone product, it may be stored in a computer readable storage medium.

The above-mentioned storage medium may be a ROM, a magnetic disk or a disk and the like. Although embodiments of the present disclosure have been shown and described above, it should be understood that, the above embodiments are exemplary, and it would be appreciated by those skilled in the art that the above embodiments cannot be construed to limit the present disclosure, and changes, alternatives, and modifications can be made in the embodiments without departing from scope of the present disclosure.

What is claimed is:

1. A search result aggregation method based on artificial intelligence, comprising:
   obtaining a query;
   generating a plurality of search results according to the query;
   obtaining a plurality of correspondence demand dimensions according to the query;
   aggregating the plurality of demand dimensions according to the plurality of search results, the aggregating the plurality of demand dimensions according to the plurality of search results comprises:
      analyzing syntactic structures of titles and abstracts in the plurality of search results;
      analyzing station information and webpage types corresponding to uniform resource locators (URLS) in the plurality of search results; and
      aggregating the plurality of demand dimensions according to the syntactic structures of the titles, the syntactic structures of the abstracts, the station information and the webpage types; and
   obtaining an answer corresponding to each demand dimension, and aggregating the answers corresponding to the plurality of demand dimensions according to the aggregated demand dimensions to generate an aggregation result.

2. The method according to claim 1, wherein, obtaining the plurality of corresponding demand dimensions according to the query comprises:
   obtaining a pre-generated comparison table of queries and demand dimensions;
   performing searching in the comparison table of queries and demand dimensions according to the query to obtain the plurality of demand dimensions corresponding to the query.

3. The method according to claim 2, wherein, the comparison table of queries and demand dimensions is pre-generated by steps of:
   obtaining user session information of a plurality of users;
   performing demand mining according to users' active behavior change information in the user session information, to generate the plurality of demand dimensions;
   establishing a correspondence relationship between queries in the user session information and the plurality of demand dimensions;
   generating the comparison table of queries and demand dimensions according to the plurality of demand dimensions, the queries in the user session information and the correspondence relationship.

4. The method according to claim 2, wherein, the comparison table of queries and demand dimensions is pre-generated by steps of:
   obtaining user session information of a plurality of users;
   mining a set of potential demand-related terms according to a syntactic structure of queries in the user session information;
   mining and supplementing the set of potential demand-related terms according to station information corresponding to uniform resource locators (URLS) in the search results corresponding to the queries in the user session information;
   selecting and determining the plurality of demand dimensions according to a statistic characteristic of the set of potential demand-related terms;
   establishing the correspondence relationship between the queries in the user session information and the plurality of demand dimensions;
   generating the comparison table of queries and demand dimensions according to the plurality of demand dimensions, the queries in the user session information and the correspondence relationship.

5. The method according to claim 1, wherein, obtaining the answer corresponding to each demand dimension, and aggregating the answers corresponding to the plurality of demand dimensions according to the aggregated demand dimensions to generate the aggregation result, comprises:
   obtaining the answer corresponding to each demand dimension from the plurality of query results;
   mapping the answers corresponding to respective demand dimensions to the aggregated demand dimensions, and aggregating the answers mapped to the same demand dimension together to generate the aggregation result.

6. The method according to claim 1, further comprising:
   determining demand dimensions not contained by the aggregation result, and displaying the demand dimensions not contained by the aggregation result in a search result page in a form of related queries.

7. A search result aggregation apparatus based on artificial intelligence, comprising:
   one or more processors;
   a memory, configured to store one or more software modules executable by the one or more processors,
   wherein the one or more software modules comprises:
      a query obtaining module, configured to obtain a query;
      a search result obtaining module, configured to generate a plurality of search results according to the query;
      a demand dimension obtaining module, configured to obtain a plurality of correspondence demand dimensions according to the query;
      a first aggregation module, configured to aggregate the plurality of demand dimensions according to the plurality of search results;
      an answer obtaining module, configured to obtain an answer corresponding to each demand dimension; and
      a second aggregation module, configured to aggregate the answers corresponding to the plurality of demand dimensions according to the aggregated demand dimensions to generate an aggregation result;
   wherein, the first aggregation module comprises:
      a first analysis unit, configured to analyze syntactic structures of titles and abstracts in the plurality of search results;
      a second analysis unit, configured to analyze situation information and webpage types corresponding to uniform resource locators (URLS) in the plurality of search results; and
      an aggregation unit, configured to aggregate the plurality of demand dimensions according to the syntactic structures of the titles, the syntactic structures of the abstracts, the situation information and the webpage types.

8. The apparatus according to claim 7, wherein, the demand dimension obtaining module is configured to:
   obtain a pre-generated comparison table of queries and demand dimensions;
   perform searching in the comparison table of queries and demand dimensions according to the query to obtain the plurality of demand dimensions corresponding to the query.

9. The apparatus according to claim 8, wherein the one or more software modules further comprises:

a pre-processing module, configured to obtain user session information of a plurality of users, perform demand mining according to user's active behavior change information in the user session information to generate the plurality of demand dimensions, establish a correspondence relationship between queries in the user session information and the plurality of demand dimensions, and generate the comparison table of queries and demand dimensions according to the plurality of demand dimensions, the queries in the user session information and the correspondence relationship.

10. The apparatus according to claim 9, wherein, the pre-processing module is further configured to: obtain user session information of a plurality of users, mine a set of potential demand-related terms according to a syntactic structure of the queries in the user session information, mine and supplement the set of potential demand-related terms according to station information corresponding to uniform resource locators (URLS) in the search results corresponding to the queries in the user session information, select and determine the plurality of demand dimensions according to a statistic characteristic of the set of potential demand-related terms, establish the correspondence relationship between the queries in the user session information and the plurality of demand dimensions, and generate the comparison table of queries and demand dimensions according to the plurality of demand dimensions, the queries in the user session information and the correspondence relationship.

11. The apparatus according to claim 7, wherein,
the answer obtaining module is configured to obtain the answer corresponding to each demand dimension from the plurality of search results; and
the second aggregation module is configured to map the answers corresponding to respective demand dimensions to the aggregated demand dimensions, and aggregate the answers mapped to the same demand dimension together to generate the aggregation result.

12. The apparatus according to claim 7, wherein the one or more software modules further comprises:
a determining module, configured to determine demand dimensions not contained by the aggregation result;
a display module, configured to display the demand dimensions not contained by the aggregation result in a search result page in a form of related queries.

13. A search engine, comprising:
a processor; and
a memory, configured to store instructions executable by the processor,
wherein the processor is configured to run a program corresponding to the instructions by reading the instructions stored in the memory, so as to perform a search result aggregation method based on artificial intelligence, the method comprising:
obtaining a query;
generating a plurality of search results according to the query;
obtaining a plurality of correspondence demand dimensions according to the query;
aggregating the plurality of demand dimensions according to the plurality of search results, the aggregating the plurality of demand dimensions according to the plurality of search results comprises:
analyzing syntactic structures of titles and abstracts in the plurality of search results;
analyzing station information and webpage types corresponding to uniform resource locators (URLS) in the plurality of search results; and aggregating the plurality of demand dimensions according to the syntactic structures of the titles, the syntactic structures of the abstracts, the station information and the webpage types; and;
obtaining an answer corresponding to each demand dimension, and aggregating the answers corresponding to the plurality of demand dimensions according to the aggregated demand dimensions to generate an aggregation result.

14. The search engine according to claim 13, wherein obtaining the plurality of corresponding demand dimensions according to the query comprises:
obtaining a pre-generated comparison table of queries and demand dimensions;
performing searching in the comparison table of queries and demand dimensions according to the query to obtain the plurality of demand dimensions corresponding to the query.

15. The search engine according to claim 14, wherein, the comparison table of queries and demand dimensions is pre-generated by steps of:
obtaining user session information of a plurality of users;
performing demand mining according to users' active behavior change information in the user session information, to generate the plurality of demand dimensions;
establishing a correspondence relationship between queries in the user session information and the plurality of demand dimensions; and
generating the comparison table of queries and demand dimensions according to the plurality of demand dimensions, the queries in the user session information and the correspondence relationship,
or, wherein, the comparison table of queries and demand dimensions is pre-generated by steps of:
obtaining user session information of a plurality of users;
mining a set of potential demand-related terms according to a syntactic structure of queries in the user session information;
mining and supplementing the set of potential demand-related terms according to station information corresponding to uniform resource locators (URLS) in the search results corresponding to the queries in the user session information;
selecting and determining the plurality of demand dimensions according to a statistic characteristic of the set of potential demand-related terms;
establishing the correspondence relationship between the queries in the user session information and the plurality of demand dimensions; and
generating the comparison table of queries and demand dimensions according to the plurality of demand dimensions, the queries in the user session information and the correspondence relationship.

16. The search engine according to claim 13, wherein, obtaining the answer corresponding to each demand dimension, and aggregating the answers corresponding to the plurality of demand dimensions according to the aggregated demand dimensions to generate the aggregation result, comprises:
obtaining the answer corresponding to each demand dimension from the plurality of query results;
mapping the answers corresponding to respective demand dimensions to the aggregated demand dimensions, and aggregating the answers mapped to the same demand dimension together to generate the aggregation result.

17. The search engine according to claim 1, wherein the method further comprises:
  determining demand dimensions not contained by the aggregation result, and displaying the demand dimensions not contained by the aggregation result in a search result page in a form of related queries.

* * * * *